April 1, 1958  F. G. STEELE  2,829,323
RATE DIGITAL CONTROL SYSTEM
Filed July 29, 1955  2 Sheets-Sheet 1

FIG. 1.

INVENTOR.
FLOYD G. STEELE
BY
Seymour M. Rosenberg
ATTORNEY

April 1, 1958   F. G. STEELE   2,829,323
RATE DIGITAL CONTROL SYSTEM
Filed July 29, 1955   2 Sheets-Sheet 2

INVENTOR.
FLOYD G. STEELE
BY
Seymour M. Rosenberg
ATTORNEY

United States Patent Office 2,829,323
Patented Apr. 1, 1958

2,829,323

RATE DIGITAL CONTROL SYSTEM

Floyd G. Steele, La Jolla, Calif., assignor to Digital Control Systems, Inc., La Jolla, Calif., a corporation of California Application July 29, 1955, Serial No. 525,148

7 Claims. (Cl. 318—28)

This invention relates to a bidirectional digital rate servo system, and more particularly to a bidirectional difunction rate servo and motor follow up system which is operative in response to an applied input difunction signal train representative of an input rate for rotating a motor shaft at a speed proportional to the input rate and in a direction corresponding to the sign of the input rate.

As will be disclosed in more detail hereinafter, the term difunction signal train as used in this application refers to a train of signals each having either a first value representing a first algebraic number or a second value representing a second algebraic number equal in amplitude to the first number but opposite in sign, and is readily distinguished from signal trains conventional in prior art digital systems in that all of the signals in the difunction signal train which have the same value represent identical numbers. For example, if it is assumed that the algebraic numbers represented by the signals in a difunction signal train are plus one and minus one, then each of the signals in the train individually represents either a plus one or a minus one, depending on the value of the signal. Accordingly, a difunction signal train may be termed a non-numerical representation of the quantity which the train represents, since the signals are not weighted according to any number system, or in other words, have no radix as this term is customarily employed.

The representation of physical or mathematical quantities by difunction signal trains has been found to be extremely useful both in the solution of mathematical equations and in the field of automatic control. In particular, several applications of difunction techniques to servo systems are disclosed in U. S. Patent 2,729,774, issued January 3, 1956, for "Difunction Non-Linear Servo System," and U. S. Patent 2,729,773, issued January 3, 1956, for "Electric Motor Control System Employing Difunction Signals," both by the same inventor. In the former there is disclosed a servo system which is operative to drive one shaft at the same speed as another shaft in response to both rate and position difunction signal trains which are representative of the relative displacement of the shafts with respect to each other. In the latter case, on the other hand, there is disclosed a digital servo system which utilizes difunction signals to provide both derivative and proportionate control of a motor to drive the motor to a position corresponding to a binary number.

In at least one instance in the prior art, conventional digital techniques have also been applied to servo systems in general and to a rate servo in particular, as disclosed in U. S. Patent 2,537,427, issued January 9, 1951, to E. Seid et al. This reference discloses a unidirectional digital servo which is operative to drive a motor shaft either to a position corresponding to a binary number stored in a reversible counter, or at a rate proportional to a rate represented by an applied pulse train which is composed of a series of randomly occurring pulses representative of a unidirectional rate, or in other words a rate having a fixed polarity.

The principal disadvantages of Seid's servo system are, firstly, that it is inherently a unidirectional system capable of following only an input rate of one polarity, secondly, that the pulse trains received and generated internally are asynchronous or randomly occurring and thus require a relatively large amount of auxiliary synchronizing equipment, and thirdly, that the circuits required to operate with conventional pulse trains are both extremely complex and expensive to construct, operate and maintain. In addition, the complexity of the equipment required materially decreases the reliability of the servo system per se and of the entire system in which the servo is employed.

In accordance with the present invention, on the other hand, there is provided a relatively simple digital rate servo which operates upon and in response to difunction signal trains and is both bidirectional and inherently a synchronous device. In accordance with the basic concept of the invention, the difunction rate servo herein disclosed functions to drive an associated motor shaft at a rate corresponding in direction and proportional in magnitude to the direction and magnitude of a rate represented by an applied input difunction signal train.

More specifically, the difunction rate servo herein disclosed is operable to generate a difunction signal train consonant with the input train and representative of the magnitude and direction of the shaft rotation, to combine the generated signal train with the input signal train to produce a third difunction signal train representative of the difference rate between the input rate and the rate of shaft rotation, and to store a count representative of the positional error, or in other words, the integral with respect to time of the difference rate, the most significant digit of the count being utilized as a difunction signal for controlling the direction of energization of the motor. The term consonant, as herein employed in referring to the difunction signal trains, signifies that each difunction signal in each difunction signal train has the same period as all other difunction signals, and that the number of difunction signals occurring in one train over a given length of time equals the number of signals which occur in the other difunction signal trains over a similar length of time.

In accordance with the invention, the bidirectional difunction rate servo system of the invention may be constructed to provide precise motor follow-up or coarse motor follow-up. In addition, according to different embodiments of the invention the rate servos herein disclosed may provide either control of the direction of motor energization alone, or both control the direction of energization and proportionate control of the amplitude of energization in accordance with the amplitude of the positional error.

It is, therefore, an object of the invention to provide a bidirectional digital rate servo system.

Another object of the invention is to provide an inherently synchronous bidirectional digital rate servo system which is operative to drive a shaft at a rate proportional to the rate represented by an applied input difunction signal train.

A further object of the invention is to provide a bidirectional digital rate servo system which is operative to drive a motor shaft at a rate proportional to the rate represented by an applied input difunction signal train, the system being operative to generate an output difunction signal train consonant with the input train and representative of the direction and magnitude of shaft rotation, and to generate signals representing the integral of the difference between the input and output rates for controlling the energization of the motor.

Still another object of the invention is to provide a bidirectional digital rate servo which is operative in response to an applied input difunction signal train representative of an input rate to rotate a motor shaft at a rate proportional to the input rate by producing an output difunction signal train representative of the shaft rate, combining the input and output trains to produce a third difunction signal representative of the difference between the input and output rates, and integrating the third difunction signal train to produce a difunction control signal for controlling the direction of energization of the motor.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Before proceeding with the detailed description of the bidirectional difunction rate servo of the invention, it is considered appropriate first to define more fully the terminology employed in difunction representation and to illustrate the mathematical and physical significance of difunction signals as they are utilized to convey intelligence information.

As used in this specification, the term difunction signal train refers to a train of signals each having either a first value representing a first algebraic number $N_1$ or a second value representing a second algebraic number $N_2$, the algebraic numbers $N_1$ and $N_2$ having the same magnitude but opposite polarities. A difunction signal train may be readily distinguished from signal trains conventional in prior art computer systems in that all of the signals in the conventional signal train having the same value represent different numbers depending upon the number system employed and the relative position or weighting of the signal in the train. For example, in a binary number system signal train progressing from least significant digit first, successive signals represent the numbers 1 or 0, 2 or 0, 4 or 0, . . . $2^n$ or 0. On the other hand, in a difunction signal train in which the algebraic numbers are $-1$ and $+1$, all of the signals represent either $+1$ or $-1$, depending upon the value of the signal. Stated differently, a difunction signal train differs from conventional numerical signal trains in that the signals of the difunction train are unweighted, each signal having equal significance with every other signal. Therefore, a difunction signal train may be termed a non-numerical representation, since the signals are not weighted according to any number system.

Difunction signal trains may take numerous forms, the most common of which are, according to this invention, a bilevel electrical signal train, or a train of bipolar electrical pulses. For purposes of clarity and simplicity, the following discussion of difunction signal trains and of the specific embodiments of this invention will be limited to a normalized system for a bilevel electrical signal train in which each signal has a predetermined time duration or period T and either a relatively high level representing the algebraic number $+1$ or a relatively low level representing the algebraic number $-1$.

Figure 1:
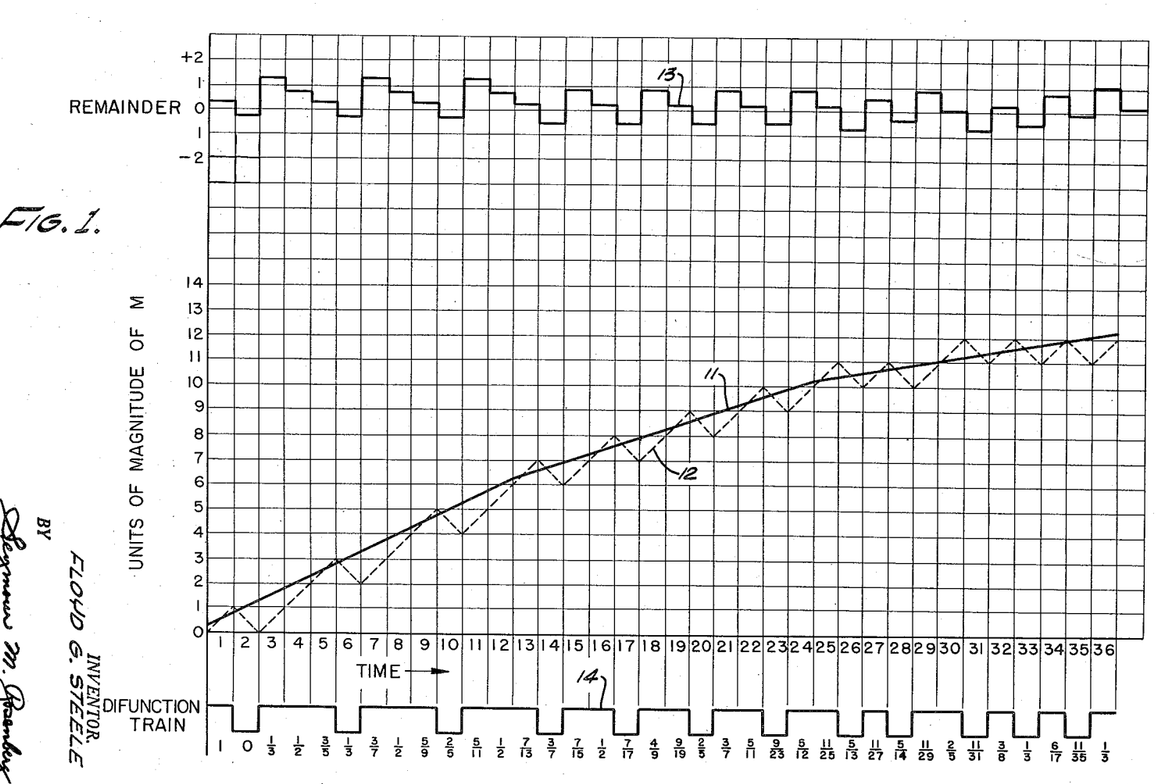
Fig. 1 is a composite diagram including a curve representing a variable as a function of time and a curve illustrating the difunction representation thereof.

In order to present more fully the theory and application of difunction signal trains, reference is now made to Fig. 1 which is a composite graphical representation of the variations of a variable quantity to be measured and the equivalent difunction signals. More particuarly, there is shown in Fig. 1 a curve generally designated 11 representing the variations in units of magnitude with respect to time of a variable quantity M to be measured. It can readily be seen that curve 11 has slopes of ½, ⅓, and ⅙ for the first, second and third sets, respectively, of twelve units of time T. In addition, it can readily be observed that the average slope of curve 11 over the entire thirty-six units of time T shown in the drawing is equal to ⅓. It will now be demonstrated how the variations in quantity M may be represented by a difunction signal train and the significance of the train with respect to the properties of these variations.

As stated above, it will be assumed that the difunction signal train is established in a normalized system in which each difunction signal represents either the algebraic number $+1$ or the algebraic $-1$. In other words, with respect to curve 11, each difunction signal can represent either a positive increment of one unit of magnitude per unit of time or a negative increment of one unit of magnitude per unit of time. Obviously, since curve 11 does not vary in this form of unital variation, a single difunction signal can only approximate the variations in the quantity M. However, if it is assumed for the moment, that the absolute magnitude of the maximum variation in quantity M is equal to one unit of magnitude per unit of time T, the single difunction signal will approximate the variation in quantity M per each unit of time to an extremely close degree. In fact, under the assumed conditions, the difunction signal will represent the most significant digit of the actual variation. Accordingly, if the system for generating the difunction signal train took into account the remainder, or in other words the difference between the actual variation experienced by quantity M and the unit variation represented by the difunction signal, and generated the succeeding difunction signal in a manner to reduce the remainder towards zero, this accuracy of the difunction signal train in representing the variations in quantity M would at least be maintained.

The concepts set forth in the preceding paragraph can be restated in terms of simple mathematics. Assume that at an arbitrary point in time designated the beginning of the first time interval of Fig. 1, the system has an initial remainder $R_0$. Assume also that the system generates a difunction signal $\not{\!p}_1$ at this instant. Then, by definition, the remainder $R_1$ at the end of the first interval may be written as:

$$R_1 = \Delta M_1 + R_0 - \not{\!p}_1 \qquad (1)$$

where $\Delta M_1$ represents the change in the variable quantity M during the first interval.

At the end of the first interval, a second difunction signal $\not{\!p}_2$ is generated and the new remainder $R_2$ at the end of the second interval is equal to:

$$R_2 = R_1 + \Delta M_2 - \not{\!p}_2 \qquad (2)$$

Generalizing Equation 2 for a remainder $R_n$ at the end of the $n^{th}$ interval results in:

$$R_n = R_{n+1} + \Delta M_n - \not{\!p}_n \qquad (3)$$

or, substituting for $R_{n-1}$ the values that would be obtained in each of the succeeding equations, $$R_n = R_0 + \sum_1^n \Delta M_i - \sum_1^n \not{\!p}_i \qquad (4)$$

$$= R_0 + \Delta M_{(0-n)} - \sum_1^n \not{\!p}_i \qquad (5)$$

From Equation 5, it is readily observed that under the assumed initial conditions the summation of the difunction signals generated over $n$ units of time T will approximate the value of the total change $\Delta M_{(0-n)}$ of variable quantity M for time $nT$. In addition it is also readily observed from Equation 3 that the change in remainder during any interval can never exceed the quantity $(\Delta M_n - D_n)$ which, under the assumed conditions, is limited to ±2 units of magnitude. Accordingly, the maximum magnitude of the remainder at the end of any time interval is equal to 2 units.

Reference is again made to Fig. 1 to illustrate how the concepts and equations set forth above are applied to a difunction signal train generating system in order to represent the variable quantity M. As shown in the drawing, quantity M has an initial slope of one-half while remainder $R_0$ has an initial value of one-quarter. Assume also that the difunction signal starts from zero, and that the first difunction signal to be generated is a +1. This first difunction signal $\cancel{D}_1$ is indicated by that portion of dotted line 12 of Fig. 1 which occurs during the first time interval.

At the end of the first time interval, the difunction signal train, represented by line 12, has a value of +1 while the variable M, represented by curve 11, has a value of +¾. Accordingly, from Equation 1, remainder $R_1$ is equal to −¼, as indicated by the graphical remainder representation, generally designated 13, during the second time interval, which represents the difference between curve 11 and difunction line 12 at the end of each interval. Since the remainder is negative, the systems will generate a −1 difunction signal in order to drive the next remainder towards zero.

It should be pointed out that although the system is designed to generate a difunction signal which drives the remainder towards zero, and, therefore, according to Equation 5, makes the summation of the difunction signals over the entire interval of time equal to the amplitude of the total change in the variable quantity at the end of the interval, the difunction signal generated can be only ±1. Accordingly, there will be a number of instances in which the absolute magnitude of the remainder at the end of an interval will be greater than the absolute magnitude of the remainder at the end of the preceding interval. As will be pointed out more fully below, this limitation is inherent in the difunction system and is required in order to make the rate of change represented by the difunction signal train closely approximate the rate of change of variable quantity M.

Returning now to Fig. 1, it is clear that difunction signal $\cancel{D}_2$ will be a −1, since remainder $R_1$ is negative. Accordingly, as shown in the drawing and as represented by Equation 2, remainder $R_2$ at the end of the second interval will be equal to $$R_1 + \Delta M_2 - \cancel{D}_2 = -\tfrac{1}{4} + \tfrac{1}{2} - (-1) = 1\tfrac{1}{4}$$

Therefore difunction signal $\cancel{D}_3$ will be a +1 and the remainder $R_3$ will be equal to $$R_2 + \Delta M_2 - \cancel{D}_3 = 1\tfrac{1}{4} + \tfrac{1}{2} - 1 = +\tfrac{3}{4}$$

Similarly signal $\cancel{D}_4$ and remainder $R_4$ are +1 and +¼, respectively; signal $\cancel{D}_5$ and remainder $R_5$ are +1 and −¼, respectively; and signal $\cancel{D}_6$ and remainder $R_6$ are −1 and +1¼, respectively.

At this point, namely at the end of the sixth time interval, difunction signal $\cancel{D}_6$ and remainder $R_6$ are identical with difunction signal $\cancel{D}_2$ and remainder $R_2$. Accordingly, since curve 11 representing quantity M has been chosen to have a constant slope of +½, the patterns of difunction signals and remainders will be repeated. In other words, difunction signals $\cancel{D}_7$ through $\cancel{D}_{10}$ are identical to difunction signals $\cancel{D}_3$ through $\cancel{D}_6$, respectively, and remainders $R_7$ through $R_{10}$ are identical to remainders $R_3$ through $R_6$, respectively. If the slope of curve 11 were to remain constant at +½, the system would continue to generate this same repetitive pattern of three +1's and one −1. However for the curve 11 shown in the drawing the system will continue to generate this same repetitive pattern until the end of the twelfth time interval at which time $\Delta M$ changes from +½ to +⅓.

Consider now the relative values of curve 11, difunction train 12 and remainder $R_{12}$ at the end of the twelfth interval. As shown in the drawing, quantity M is at a value of +6¼, difunction train 12 is at a value of +6 and remainder $R_{12}$ is equal to +¼. Accordingly, the system will generate a difunction signal $\cancel{D}_{13}$ equal to +1 and remainder $R_{13}$, from Equation 3, will be equal to $R_{12} + \Delta M_{12} - \cancel{D}_{12} = +\tfrac{1}{4} + \tfrac{1}{3} - 1 = -\tfrac{5}{12}$, as represented by train 13. Difunction $\cancel{D}_{14}$ is, therefore, equal to −1 and remainder $R_{14}$ is equal to $-\tfrac{5}{12} + \tfrac{1}{3} + 1 = +\tfrac{11}{12}$. Similarly, difunction signal $\cancel{D}_{15}$ is equal to +1 and remainder $R_{15}$ is equal to +¼.

Accordingly, at the end of the fifteenth interval, difunction signal $\cancel{D}_{15}$ and remainder $R_{15}$ are identical with difunction signal $\cancel{D}_{12}$ and remainder $R_{12}$, respectively. Since the slope of curve 11 remains constant at +⅓ for the next nine intervals, namely intervals 16 through 24, the patterns of difunction signals and remainders during this period will be identical with the patterns during the thirteenth through fifteenth intervals. In other words, the pattern of difunction signals will progress in the order +1, −1, and +1, while the pattern of the remainders will progress in the order −5/12, +11/12, +¼.

At the end of the twenty-fourth interval, the difunction train 12 is at a value of +10, quantity M, as represented by curve 11, is at a value of +10¼, and the remainder is +¼. Accordingly, difunction signal $\cancel{D}_{25}$ is +1 and remainder $R_{25}$ is equal to $\tfrac{1}{4} + \tfrac{1}{6} - 1 = -\tfrac{7}{12}$. Similarly, difunction signal $\cancel{D}_{26}$ and remainder $R_{26}$ are equal to −1 and +7/12, respectively; while difunction signal $\cancel{D}_{27}$ and remainder $R_{27}$ are equal to +1 and −¼, respectively. The remaining values for the difunction signals and the remainders should be readily ascertainable in the manner set forth above and are, therefore, merely tabulated below:

| Interval | Difunction | Remainder |
| --- | --- | --- |
| 28 | −1 | $+\tfrac{11}{12}$ |
| 29 | +1 | $+\tfrac{1}{12}$ |
| 30 | +1 | $-\tfrac{3}{4}$ |
| 31 | −1 | $+\tfrac{5}{12}$ |
| 32 | +1 | $-\tfrac{5}{12}$ |
| 33 | −1 | $+\tfrac{3}{4}$ |
| 34 | +1 | $-\tfrac{1}{12}$ |
| 35 | −1 | $+1\tfrac{1}{12}$ |
| 36 | +1 | $+\tfrac{1}{4}$ |

Consider now the difunction signal train generated by the system in the following curve 11 representing the variations in quantity M. It will be recalled from Equation 5 that the summation of the difunction train, as represented by line 12, will closely approximate the value of the variable quantity M, as represented by curve 11, and will never differ from the total change in quantity M by more than an absolute magnitude of two units. This statement is clearly borne out by remainder curve 13 of Fig. 1. An even more significant result is obtained if both sides of Equation 5 are divided through by $nT$ and the initial condition $$\frac{R_0}{nT}$$

is subtracted from both sides, one obtains:

$$\frac{R_n - R_0}{nT} = \frac{M_n}{nT} - \frac{\sum_1^n \not{D}_i}{nT} = (A_v \Delta M)_n - (A_v \not{D}_i)_n \quad (6)$$

where $(A_v \Delta M)_n$ signifies the average rate of change of variable quantity M during $nT$ intervals and $(A_v \not{D}_i)_n$ signifies the average value of the difunction signal train during the same number of intervals. Assuming a value of T equal to unity, therefore, signifies that the average value of the difunction signal train approximates the average slope of the variable M, the maximum difference between these averages being $$\pm \frac{4}{nT}$$

owing to the fact that each of remainders $R_0$ and $R_n$ has a maximum value of $\pm 2$, as previously set forth. Obviously, as the sampling interval $nT$ is increased, the maximum error in the difunction average decreases until the error is essentially insignificant.

Furthermore, rewriting Equation (5) for $mT$ intervals, one obtains:

$$R_m = R_0 + \Delta M_{(0-m)} - \sum_1^m \not{D}_i \quad (7)$$

and subtracting Equation 7 from Equation 5 yields:

$$R_n - R_m = \Delta M_{(0-m)} - \Delta M_{(0-m)} - \sum_1^n \not{D}_i + \sum_1^m \not{D}_i$$

$$= \Delta M_{(m-n)} - \sum_{m+1}^n \not{D}_i \quad (8)$$

Dividing Equation 8 through by the number of time intervals represented, namely $(n-m)T$, yields:

$$\frac{R_n - R_m}{(n-m)T} = \frac{M_n - M_m}{(n-m)T} - \frac{\sum_{m+1}^n \not{D}_i}{(n-m)T}$$

$$= (A_v \Delta M)_{n-m} - (A_v \not{D}_i)_{n-m} \quad (9)$$

where $(A_v \Delta M)_{n-m}$ signifies the average rate of change of variable quantity M between interval $mT$ and interval $nT$, and $(A_v \not{D}_i)_{n-m}$ signifies the average value of the difunction signal train during the same intervals. In this instance, the maximum value of the error $$\frac{R_n - R_m}{(n-m)T} \text{ is equal to } \pm \frac{4}{n-m}$$

Reference is again made to Fig. 1 to illustrate the applicability of Equations 6 and 9 to the average rate of change of quantity M illustrated by curve 11. As shown in the drawing, quantity M progressed from an initial value of $+\frac{1}{4}$ to a final value of $+12\frac{1}{4}$ in 36 intervals. Therefore the average rate of change of quantity M, or the average slope of curve 11, during the entire period is equal to $+\frac{12}{36}$ or $+\frac{1}{3}$. During the same period the difunction signal train included 24 $+1$ signals and 12 $-1$ signals. Therefore the average value represented by the difunction signal train is equal to $$\frac{+24 - 12}{36}$$

or $+\frac{12}{36}$ or $+\frac{1}{3}$. Similarly, at the end of twenty-four time intervals, quantity M has attained the value of $+10\frac{1}{4}$ or a net average change of $+\frac{5}{12}$ while the average value of the difunction signal train is $$\frac{+17 - 7}{24}$$

or $+\frac{5}{12}$. It is thus seen that at the selected points, the average value of the difunction signal train is exactly equal to the average rate of change of quantity M over the intervals between the starting point and the selected points. In other words, at the selected points Equation 6 is fully satisfied with the remainder $R_n$ being exactly equal to the initial remainder $R_0$.

Consider now the applicability of Equation 9 to the drawings, utilizing the values established at the points specified in the preceding paragraph with $n$ equal to 36 and $m$ equal to 24. From the drawing the average rate of change of quantity M between the specified points is $+\frac{1}{6}$. On the other hand, the average rate of change indicated by the difunction signal train is equal to $$\frac{+7 - 5}{12}$$

or $+\frac{1}{6}$. Similarly, choosing $n$ as 24 and $m$ as 12, the average slope of quantity M is $+\frac{1}{3}$, while the average value of the difunction signal train during the interval is $$\frac{+8 - 4}{12}$$

or $+\frac{1}{3}$. It is thus seen that, between the selected points, the average value of the difunction signal train is exactly equal to the average rate of change of quantity M or the average slope of curve 11.

It should be noted that the points thus far selected have not been arbitrary but were selected for specific reasons. More particularly, both sets of points were chosen firstly because they represented constant slopes for curve 11, and secondly because it was known that both of the constant slopes could be represented exactly in twelve time intervals. It will now be demonstrated that the difunction signal train will accurately represent the slope of curve 11 even when the slope is not a constant and/or the average slope cannot be represented exactly in the number of time intervals selected.

Consider first the average slope of curve 11 between the first or initial point and any other point in comparison with the average value represented by the difunction signals, these latter values being indicated below curve 14. More particularly, the average slope of curve 11 during the first thirty-five time intervals is equal to $\frac{1}{35}(12\frac{1}{12} - \frac{1}{4}) = \frac{1}{35}(11\frac{5}{6})$. On the other hand, the average value of train 14 during the same period is equal to $+\frac{11}{35}$. It will now be shown that the value of the difunction signal train approximates the average of curve 11 within the limits of accuracy set forth in Equation 6.

Assume that an arbitrary fraction $$\frac{a}{b}$$

is to be represented in $n$ time intervals, or in other words by a difunction signal train having $n$ signals of which $x$ are $+1$'s and $(n-x)$ are $-1$'s. Then by definition, the average value of the difunction signal train is equal to $$\frac{x - (n-x)}{n} \text{ or } \frac{2x - n}{n}$$

Equating the two values and solving for $x$, one obtains:

$$x = \frac{n}{2b}(a+b) \quad (10)$$

In the selected examples, the denominator $b$ is exactly equal to $n$, that is the slope as measured over $n$ intervals, and Equation 10 may be rewritten as:

$$x = \frac{1}{2}(a+b) \quad (11)$$

$$= \frac{1}{2}(a+n) \quad (12)$$

Solving Equation 12 for the slope of curve 11 over thirty-five intervals yields:

$$x = \frac{1}{2}(11\frac{5}{6} + 35)$$

$$= \frac{1}{2}(46\frac{5}{6})$$

Since $x$ must be an integer, it is apparent that the average value of the difunction signal train over a period of thirty-five intervals cannot exactly represent the average slope of the curve over the period. In fact the closest possible values for $x$ are 22, 23, and 24 for which the average values of the train would be $9/35$, $11/35$, and $13/35$, respectively. It is, therefore, seen that difunction signal train 14 for the first thirty-five intervals shown in the drawing has an average value ($11/35$) which most closely approximates the average slope of curve 11 within the limits of accuracy of the system and has an error of less than $1/35$.

Similar approximations are made by train 14 during all of the other intervals. For example, the average slopes of curve 11 at the ends of the thirty-fourth, thirty-third, and thirty-second intervals are $1/34$ ($11 4/6$), $1/33$ ($11 1/2$), $1/32$ ($11 1/3$), respectively, while the corresponding averages of difunction train 14 are $9/17$ or $12/34$, $1/3$ or $11/33$, and $3/8$ or $12/32$, respectively. In fact, at a number of points, namely the ends of the fourth, eighth, twelfth, fifteenth, eighteenth, twenty-first, twenty-fourth and thirty-sixth intervals, the average values of train 14 are exactly equal to the slopes of curve 11.

It is important to note under what conditions the average value of difunction signal train 14 will be exactly equal to the average slope of curve 11. With reference to Equations 11 and 12, it is readily seen that, since $x$ must be an integer, the slope can be exactly represented whenever the sum of the numerator and denominator of the arbitrary fraction to be represented is equal to an even number. In other words, at the ends of the fourth, eighth, twelfth, fifteenth, eighteenth, twenty-first, twenty-fourth, and thirty-sixth intervals, where the slopes of curve 11 are $2/4$, $4/8$, $6/12$, $7/15$, $8/18$, $9/21$, $10/24$, and $12/36$, $x$ is an integer and the average of difunction signal train 14 exactly represents the average slope of curve 11. In addition, it should be noted that during the first twelve intervals when the slope of curve 11 is constant at $1/2$, difunction train 14 follows a repetitive pattern of $+1$, $-1$, $+1$ whose average value is exactly equal to the slope of curve 11 at the end of each period of four intervals.

From these observations and from Equation 10, it can be readily determined that for any constant slope $$\frac{a}{b}$$

the difunction train will exactly represent the slope at a number of points, and that these points will be at periods from the starting point which are integral multiples of $n_0$ where $n_0$ is the least number of time intervals required to represent $$\frac{a}{b}$$

and is defined as $2b$ when the sum of $a$ and $b$ is odd, and $b$ when the sum of $a$ and $b$ is even. In the illustration used in the last paragraph, a slope $$\frac{a}{b}$$

equal to $1/2$ requires a minimum number $n_0$ of time intervals equal to $2b$ or 4 in order for a difunction train to exactly represent the slope. This minimum period $n_0$ may be referred to as a recurrence interval and the pattern established therein may be termed a recurrence pattern.

Although the concepts of recurrence intervals and patterns have been set forth only for a constant slope of $1/2$, they are equally applicable to all other slopes within the ranges contemplated for the system. For example, consider curve 11 during the thirteenth through twenty-fourth interval, when the slope $$\frac{a}{b}$$

is equal to $1/3$. By definition, the minimum recurrence period $n_0$ for this slope is equal to 3 time intervals. This conclusion is clearly borne out by the drawing wherein train 14 has a recurrence pattern of $+1$, $-1$, $+1$ for four periods $n_0$. Similarly, during the twenty-fifth through thirty-sixth time intervals, when the slope $$\frac{a}{b}$$

of curve 11 is equal to $1/6$, and twelve time intervals are required for the recurrence period $n_0$, no repetitive pattern is established for the difunction signal train.

It is of importance to note one further point in connection with the slope of curve 11 during the last twelve time intervals. It has been pointed out that the recurrence period required is twelve time intervals, but no statement has been made regarding the pattern or patterns established during this period. Consider now in detail the signals of difunction signal train 14 during this period and its relationship to previously established patterns.

It will be noted that during intervals twenty-five through twenty-seven, the pattern is precisely the same as that occurring during the recurrence period equivalent to a slope of $1/3$. A similar resemblance can be observed for the pattern during intervals thirty through thirty-two. On the other hand, the pattern occurring during the intervals twenty-eight and twenty-nine is $-1$, $+1$ which has an average value of $$\frac{1-1}{2}$$

or zero. A similar pattern is established for each pair of intervals of the last four intervals, that is two recurrence patterns of $+1$, $-1$ having an average value of zero. Accordingly, the last twelve signals of difunction signal train 14 include two recurrence patterns of $+1$, $-1$, $+1$ or $1/3$ and three recurrence patterns of $-1$, $+1$ or zero, the average of these patterns being one-twelfth of the sum of $1/3$ for six intervals and zero for six intervals or $$\frac{6(1/3)+6(0)}{12}$$

or $2/12$ or $1/6$.

It is, therefore, apparent that the difunction signal train will have an average value which closely follows the average slope of a constantly increasing curve 11, regardless of the actual value of the slope. It is obvious that the difunction signal train would follow a constantly decreasing slope equally as well. It has also been demonstrated that the difunction signal train closely follows the slope of the curve even though the curve progresses. It remains to be shown that Equation 9 is continuously followed for a fixed number of sampling time intervals $(n-m)$, as both $n$ and $m$ progress. In other words, it remains to be shown that signal difunction train 14 presents a continuous moving average of the slope of curve 11 during each sampling period.

Assume now a sampling period of ten intervals, that is $(n-m)$ equal to 10. Under these conditions consider the average value represented by train 14 and the slope of curve 11 as $n$ progresses from ten time intervals upward. Since curve 11 has a constant slope of $1/2$ for the first twelve intervals, then the slope of curve 11 remains constant for the first three sampling periods, that is for $n$ equal to 10, 11 and 12. On the other hand, as indicated by the number beneath the tenth signal of difunction signal train 14, the average represented by the train during the first sampling period is equal to $2/5$.

It will be recalled that the average value of a difunction signal train having $n$ signals of which $x$ represent $+1$ is $$\frac{2x-n}{n}$$

In the instant case, where $n$ is assumed to be 10, the average values which may be obtained are $$\frac{2x-10}{10}$$

Since $x$ has been defined as an integer, the difunction train can represent only even number of tenths. Accordingly, a slope of ½ or 5/10 can be represented only approximately by a 10-signal difunction train either as 4/10 where $x$ is 7, or as 6/10 where $x$ is 8. In the drawing difunction signal train 14 represents the slope of curve 11 during the first ten intervals as 4/10 or 2/5. Similarly, for the periods of intervals 2 through 11 and 3 though 12, difunction signal train 14 represents the slope 5/10 as 4/10 and 6/10, respectively.

Thereafter, as set forth above, the instantaneous slope changes from ½ to ⅓ and remains constant at ⅓ for twelve intervals. Accordingly, the average slope for each period of ten time intervals will progressively decrease from ½ to ⅓. It will now be demonstrated that the average number represented by each group of ten difunction signals will be a moving average of these progressively decreasing slopes.

Consider first the average slope of curve 11 between the fourth through thirteenth intervals and the corresponding average value represented by difunction signal train 14. As shown in the drawing, the average slope of curve 11 during the selected period is 1/10(6 7/12−1¾) or 1/10(4 5/6), while the average value represented by the train is 1/10(8−2) or 6/10. Therefore the average represented by difunction signal train 14 accurately represents the average slope of curve 11 during the selected period. Similarly, the average slope of curve 11 during the fifth through fourteenth intervals is 1/10(6 11/12−2¼) or 1/10(4⅔), while the difunction signal train average is 1/10(7−3) or 4/10. For the next five sampling periods the average slopes of curve 11 are 1/10(4½), 1/10(4⅓), 1/10(4⅙), 1/10(4), and 1/10(3⅝), respectively, while the corresponding averages represented by difunction signal train 14 are 4/10, 6/10, 4/10, 4/10, and 4/10, respectively.

It is, therefore, seen that the moving average represented by difunction signal train 14 during successive periods accurately represents the changes in average slopes of curve 11. In fact, during the periods when the slopes remain constant at ½, that is the first four sampling periods, the moving averages are 4/10, 4/10, 6/10, and 6/10, respectively, with an average of 5/10 or ½. In addition, as the slopes progressively decrease to ⅓, the moving averages decrease to 4/10 and finally to a value of 2/10 during the period between the fourteenth and twenty-third intervals.

In summary, therefore it has been demonstrated that a difunction signal train can accurately represent the average rate of change of a variable quantity whenever the maximum rate of change of the quantity per unit time interval does not exceed the number represented by each signal of the train. This accurate representation may be either in the form of an overall average starting from an initial point and progressing on indefinitely, or in the form of a moving average in which the train reproduces the average rate of change during successive periods and ignores the past history of the quantity. In addition it has been shown that the summation of the difunction signal train continuously and accurately represents the total change in the variable quantity. In other words, if the initial position or condition of the quantity is taken into account, the summation of the difunction signal train can accurately and continuously represent the final position of the quantity. Finally, it should be apparent that the difunction theory is applicable to measuring quantities other than rate of change. Stated differently, if the difunction signal generating system were arranged to generate difunction signals representing instantaneous position or condition of an instrument, then the moving averages would continuously and accurately represent average position.

Although the explanation set forth has assumed that the maximum rate of change of the quantity does not exceed the number represented by each difunction signal, it should be evident that this limitation need not be rigorously imposed upon the system. More particularly, it is quite evident that greater rate of change could be accepted by the system so long as these rates are not continued indefinitely. In fact, if these rates are sparsely interspersed they will have a minor effect upon the summation of the difunction train and an essentially negligible effect upon the moving averages. In addition, in the case of moving averages even a number of excess rates will have only a temporary effect if they are continued for only a short period of time.

As a final statement, a difunction signal train will be re-compared with conventional numerical signal trains in view of the additional information presented above. It has been stated previously that the two types of signal trains are basically distinct in that the signals of a difunction train are unweighted and non-numerical. Because of this fact, it should be evident that loss of or error in a signal of the difunction signal train has very little significance as compared with a similar loss or error in a conventional numerical signal train. For the same reason a difunction signal train continuously presents a moving average regardless of the starting point. On the other hand, in a numerical signal train, the starting point is necessarily fixed to either the most or least significant digit signal and any shift in this starting point produces completely erroneous results. Similarly, the sampling periods in a numerical system are of necessity fixed and limited and there is no possibility of obtaining continuous moving averages. Finally, since each difunction signal represents maximum rate in either one direction or the other, relatively simple linear actuators are required for response to such signals. On the other hand, conventional numerical signal trains require complex conversion devices before the information can be utilized. In fact in a number of systems employing numerical signal trains it has been found that speed of response and simplicity of equipment requires that only the most significant digit signal be utilized. In such instances the superiority of difunction signal trains is obvious, since only the most significant digit signal is generated.

Figures 2, 3, 4, 5:
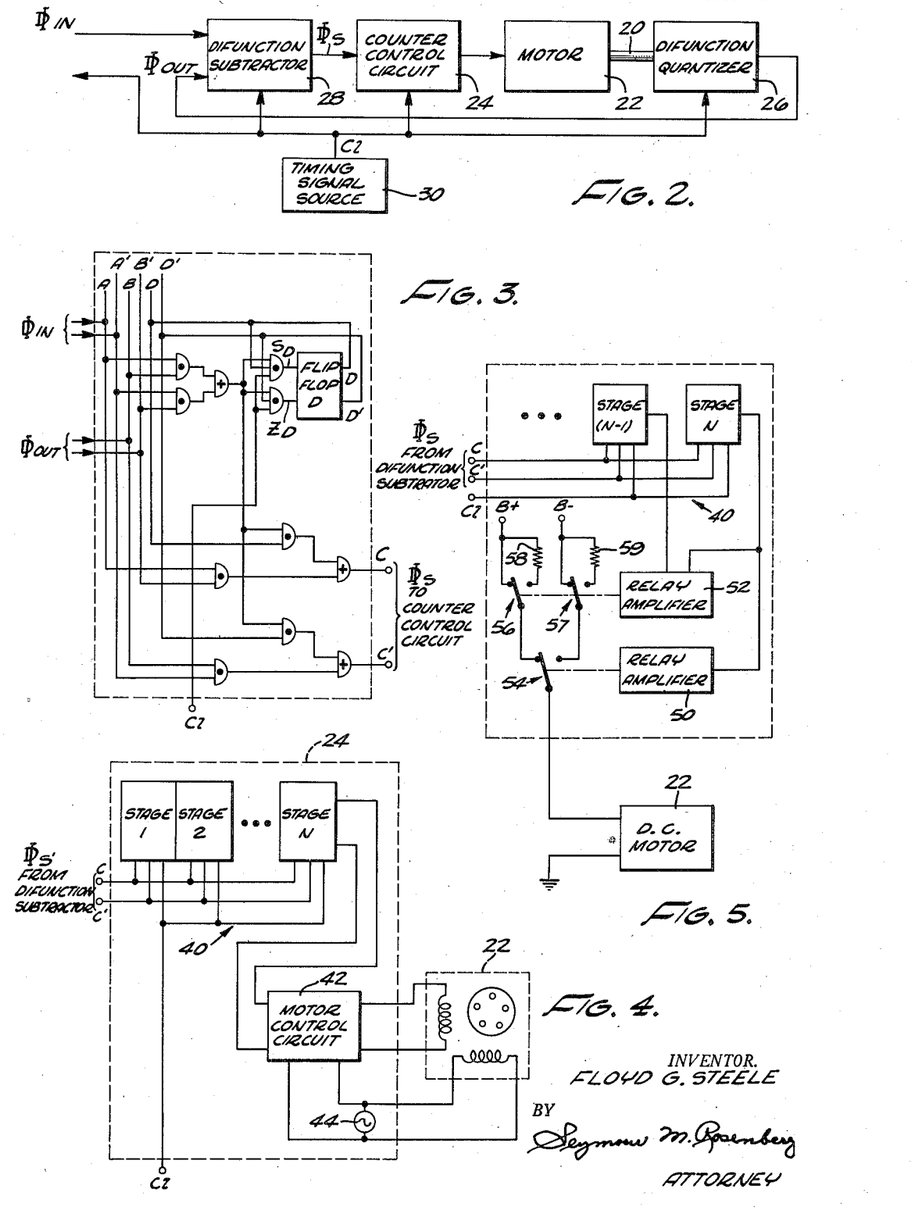
Fig. 2 is a block diagram of the bidirectional difunction rate servo system of the invention.
Fig. 3 is a circuit diagram of one form of difunction subtractor which may be employed in the rate servo system of Fig. 2.
Figs. 4 and 5 are block diagrams, partly in schematic form, illustrating two different embodiments of counter control circuits which may be employed in the rate servo system of Fig. 2.

With reference again to the drawings, wherein like or corresponding parts are designated by the same reference characters throughout the several views, there is shown in Fig. 2 a difunction digital rate servo, according to the invention, which is operative to drive a shaft 20 of a motor 22 at a rate or velocity proportional to the rate represented by an applied input difunction signal train $\cancel{D}_{in}$. As shown in Fig. 2, the digital rate servo of the invention includes four basic components, namely, motor 22, a counter control circuit 24 which is operative to control the energization of motor 22 in accordance with the magnitude of a binary number stored in the control circuit, a difunction quantizer 26 coupled to motor 22 and operative to generate a difunction output signal $\cancel{D}_{out}$ consonant with difunction train $\cancel{D}_{in}$ and representative of the rate at which motor 22 is driven, and a difunction subtractor circuit 28 which is operative to control the magnitude of the binary number stored in the counter control circuit by applying to the counter control circuit a difunction output signal corresponding to the difference rate between the input difunction rate $\cancel{D}_{in}$ and the difunction rate $\cancel{D}_{out}$ generated by quantizer 26.

In addition to the foregoing elements, the digital rate servo of the invention also includes a timing signal source 30 which is operative to generate a periodically recurring timing or clock pulse signal ($Cl$); this signal is utilized to synchronize the operation of the entire system, and is applied to counter control circuit 24, difunction quantizer 26, difunction subtractor 28, and in addition, to the input instrument, not shown, which is employed to generate input difunction signal train $\not{D}_{in}$. It will be recognized by those skilled in the computer art that timing signal source 30 may embody any of several well known structures for generating clock pulses, such as a magnetic drum having a timing track thereon, a free running multivibrator, or a conventional stabilized sine wave oscillator with an associated overdriven amplifier and differentiating circuit.

Before proceeding with the detailed description of operation of the difunction digital rate servo of the invention, consider first the structure of the various elements shown in Fig. 2. With reference now to Fig. 3 there is shown a difunction subtractor circuit which is operative to generate an output difunction signal train $\not{D}_S$ corresponding to the difference between two applied input difunction signal trains $\not{D}_{in}$ and $\not{D}_{out}$. Stated in elementary terms, the difunction subtractor, in subtracting difunction signal $\not{D}_{out}$ from difunction signal $\not{D}_{in}$, functions in accordance with the following table:

*Table I*

| $\not{D}_{in}$ Minuend | $\not{D}_{out}$ Subtrahend | Result | $\not{D}_S$ Output Difunction Representation |
|---|---|---|---|
| +1 | −1 | +2 | plus one. |
| −1 | +1 | −2 | minus one. |
| +1 | +1 | 0 | any two successive zeroes represented as an alternate (+1) and (−1). |
| −1 | −1 | 0 | |

It will be noted that when the result is a +2 or a −2, the difunction output signal from the difunction subtractor can only represent the instantaneous result with a maximum of either a +1 or a −1, respectively. In addition it will be noted that any two successive zeroes generate an alternate +1 and −1, which results in a net difference of zero in accordance with the general principles of difunction representation. Accordingly it will be recognized that the output difunction signal train generated may be expressed as:

$$\not{D}_S = \frac{\not{D}_{in} - \not{D}_{out}}{2} \quad (13)$$

Referring now with particularity to the circuit of Fig. 3, the difunction subtractor therein illustrated receives two pairs of complementary signals A, A′ and B, B′ respectively representative of the difunction input signal trains $\not{D}_{in}$ and $\not{D}_{out}$, and includes a bistable storage element, such as a flip-flop D, and a plurality of logical "and" and "or" gates which are utilized for controlling the conduction state of the flip-flop and for generating a pair of complementary output signals C and C′ representing the difference or output difunction signal train $\not{D}_S$. For purposes of description it will be assumed that signals A, B, and C correspond directly to difunction signal trains $\not{D}_{in}$, $\not{D}_{out}$ and $\not{D}_S$ that signals A′, B′ and C′ are their inverse or complementary functions. More specifically, complementary signals A′ and B′ are useful in simplifying the logical gating networks of the subtractor, while complementary signal pair C and C′ provide a pair of control signals for controlling the actuation of counter control circuit 24 in Fig. 1. For example, in the embodiment of the subtractor shown in Fig. 3, signal C when at its high level value is representative of a plus one and is operative to actuate a counter in the counter control unit to count up, as will be described hereinafter, whereas a high level voltage in signal C′ is representative of a minus one output signal and is operative to actuate the counter in the counter control unit to count down.

Before continuing further with the description of the invention, consideration will be given to the designation of the input and output conductors of flip-flop D. The flip-flop includes a pair of input conductors which are designated the S input conductor and Z input conductor respectively, each input conductor being further designated by the alphabetical subscript D corresponding to the alphabetical designation of the flip-flop. In addition the flip-flop includes a pair of output conductors one of which is designated by the same alphabetical designation as the flip-flop while the other is designated by the prime of the alphabetical designation of the flip-flop. Thus flip-flop D has both $S_D$ and $Z_D$ input conductors and D and D′ output conductors.

In operation flip-flop D will be assumed to be responsive to the application of an input signal to its S input conductor for setting to a conduction state corresponding to the binary value one or the difunction value of +1, and to the application of an input signal to its Z input conductor for setting to the opposite conduction state, which corresponds to the binary value zero or the difunction value of −1. In addition it will be assumed that when the flip-flop is in its +1 representing state the voltage presented on its correspondingly designated output conductor has a relatively high level value while the voltage presented on its prime output conductor has a relatively low level value. Conversely, when the flip-flop is in its −1 representing state the voltage presented on its correspondingly designated output conductor has a relatively low level value whereas the voltage presented on its prime output conductor has a relatively high level value. A conventional flop-flop having the described operation is shown in U. S. Patent 2,733,430, issued January 31, 1956, for "Angular Quantizer" to the present inventor.

Each "and" and "or" gate is represented in the drawings by a semi-circular hood, each "and" gate having a dot (.) in the center thereof, while each logical "or" gate includes a plus (+) in its center. The "and" and "or" gates may utilize either vacuum tubes or crystal rectifiers, and are preferably similar structurally to the gating circuits illustrated in the article entitled "How an electronic brain works" by Berkeley and Jensen, found on page 45 of the September 1951 issue of Radio-Electronics magazine. Similar "and" and "or" gates are also shown and described in the beforementioned U. S. Patent 2,733,430 by the present inventor. Briefly stated, each "and" gate includes two or more input terminals and a single output terminal and is responsive to the voltage levels of two-level signals applied to its input terminals for producing a high level voltage output signal at its output terminal only when all of the input signals are at their high level values. Each "or" gate, on the other hand, includes two or more input terminals and a single output terminal and is responsive to the voltage levels of two-level signals applied to its input terminals for producing a high level output signal at its output terminal whenever one or more of the input signals is at its high level value.

It will be recalled from Table I set forth hereinabove that the difunction output signal $\not{D}_S$ is acutally equal to $$\frac{\not{D}_x - D_R}{2}$$

owing to the fact that the actual difference between the difunction signals is either +2, 0, or −2 whereas only a +1 or a −1 may be represented by the output difunction signal. It will also be recalled that successive zeroes resulting from the subtraction operation are represented by alternate (+1)'s and (−1)'s; as will be more clearly understood from the description of operation set forth hereinbelow, flip-flop D functions as a one bit memory for indicating whether the last zero was represented as a plus one or a minus one, or in other words, to insure that successive zeroes are represented by an alternate plus one and minus one.

The mechanization of the logical gating network employed in the difunction subtractor may be expressed by the following Boolean algebraic equations:

$$S_D = (A.B + A'.B')D'.cl \quad (14)$$
$$Z_D = (A.B + A'.B')D.cl \quad (15)$$
$$C = [A.B' + (A.B + A'.B').D'] \quad (16)$$
$$C' = [A'.B + (A.B + A'.B').D] \quad (17)$$

wherein the signal $(cl)$ represents the periodically recurring clock pulse or timing signal received from a clock pulse source, not shown.

Consider now the significance of Equations 14 through 17 and the manner in which their mechanization satisfies the conditions tabulated in Table I. Equation 14 signifies set flip-flop D to its one representing state whenever a clock pulse $(cl)$ is received "and" the flip-flop is in its zero-representing state $(D')$ "and" both input difunction signals are either both plus ones $(A.B)$ "or" both minus ones $(A'.B')$. Conversely, Equation 15 signifies set flip-flop D to its zero representing state whenever a clock pulse $(cl)$ is received "and" the flip-flop is in its one-representing state $(D)$ "and" both input difunction signals are either both plus ones $(A.B)$ "or" both minus ones $(A'.B')$. In other words, Equations 14 and 15, when taken together signify that the condition state of flip-flop D is reversed each time the two input difunction signal trains are the same during a particular digit time interval.

Equation 16, on the other hand, signifies that an output difunction signal of plus one should be generated whenever the minuend difunction signal $\rlap{/}{D}_\text{in}$ is a plus one and the subtrahend difunction signal $\rlap{/}{D}_\text{out}$ is a minus one $(A.B')$, "or" whenever there is a zero difference between the input difunction signals $(A.B + A'.B')$ "and" the last zero difference was represented as a minus one $(D')$. In an analogous manner, Equation 17 signifies that an output difunction signal of minus one should be generated whenever the minuend difunction signal $\rlap{/}{D}_\text{in}$ is a minus one and the subtrahend difunction signal $\rlap{/}{D}_\text{out}$ is a plus one $(A'.B)$, "or" whenever there is a zero difference between the input difunction signals $(A.B + A'.B')$ "and" the last zero difference the input difunctions was represented as a plus one $(D)$.

It is apparent, therefore, that the difunction subtractor functions to produce a plus one difunction output signal when the difference between the input difunction signals is $(+1) - (-1) = +2$, a minus one difunction output signal when the difference between the input difunction signals is $(-1) - (+1) = -2$, and alternate plus ones and minus ones during successive intervals when the difference between the input difunction signals is zero. Accordingly it will be recognized that the particular difunction subtractor circuit shown in Fig. 3 produces an output difunction signal train which corresponds to one half the actual difference between the input difunction signal trains. However, since the polarity of the fraction represented by the difunction output signal train always corresponds to the polarity of the actual difference between the difunction input trains, and furthermore, since the polarity of the fraction represented by the output signal from the difunction subtractor is sufficient to servo the counter control circuit in the proper direction, it is clear that for the purpose of the present invention it may be stated that the difunction ouput signal from the difunction subtractor represents the difference between the applied input difunction signals.

It should also be pointed out that although the circuit of Fig. 3 is termed a difunction subtractor circuit, it is structurally identical with a difunction adder circuit, the only distinction between the use of the circuit as a subtractor or as an adder being in the points at which signals B and B' are applied. More specifically, if the points to which signals B and B' are applied were to be reversed, the circuit of Fig. 3 would be operative to add together the input difunction signal trains $\rlap{/}{D}_\text{in}$ and $\rlap{/}{D}_\text{out}$. Inasmuch as the complementary signals B and B' which constitute the difunction signal $\rlap{/}{D}_\text{out}$ from the quantizer are clearly taken from predetermined points within the quantizer, it is obvious that a reversal of the B and B' signal conductors both in the quantizer and in the circuit of Fig. 3 would enable the difunction rate servo of the invention to operate with a difunction adder circuit in lieu of a difunction subtractor circuit. Accordingly, it is to be expressly understood that the use of the term "difunction subtractor circuit," both in the specification and in the appended claims, is intended to encompass all such equivalent structures and especially those where a change in terminology merely implies a double reversal of a pair of conductors without any change whatsoever in the basic mode of operation.

Consider now the structure and function of difunction quantizer 26 shown in Fig. 2. The difunction quantizer is a bidirectional device and is preferably structurally similar to the difunction quantizer shown in U. S. Patent 2,733,430, issued January 31, 1956 for "Angular Quantizer" by the same inventor. Another quantizing device suitable for producing a difunction output is shown and described in the applicant's copending application entitled "Difunction Converters," Serial No. 322,085, filed November 22, 1952. Briefly stated, the bidirectional quantizer is operative to generate a zero representing difunction signal train composed of alternate plus ones and minus ones when shaft 20 of motor 22 is stationary, and is operative to interrupt this sequence with an additional plus one or minus one signal whenever shaft 20 has moved in one direction or the other, respectively, through a predetermined incremental angle. Thus, for example, if an additional plus one is generated for each 10° of clockwise rotation while an additional minus one is generated for each 10° of counterclockwise rotation, then a clockwise rotational rate of 1 R. P. S. will operate to produce 36 extra plus ones in difunction signal train $\rlap{/}{D}_\text{out}$, whereas a counterclockwise rotational rate of 1 R. P. S. will operate to produce 36 minus ones in the output signal train.

It is clear, of course that the individual difunction signals generated during the remaining clock intervals which occurred during the one second period will have alternate plus one and minus one values. Recalling from the description of difunction terminology as set forth hereinbefore that the average value of a difunction train is equal to $$\frac{x - (n - x)}{n}$$

where $x$ is the number of $+1$'s occurring in n clock intervals and $n - x$ is the number of $-1$'s occurring during same interval, the average value of the output difunction signal train $\rlap{/}{D}_\text{out}$ for a given rate R may be expressed as:

$$\rlap{/}{D}_\text{out} = \frac{\left[\frac{360}{\Delta r}R + \frac{f_{cl} - \frac{360}{\Delta r} \cdot R}{2}\right] - \left[\frac{f_{cl} - \frac{360}{\Delta r} \cdot R}{2}\right]}{f_{cl}}$$

$$\rlap{/}{D}_\text{out} = \frac{360 R}{\Delta r \cdot f_{cl}} \quad (18)$$

where
$R =$ number of revolutions of the shaft in R. P. S., the sign of R corresponding to the direction of rotation;
$\Delta r =$ the rotational increment in degrees which results in the generation of a single extra $(+1)$ or $(-1)$; and
$f_{cl} =$ the frequency of the periodically recurring clock pulse signal in cycles per second (C. P. S.).

In practice, of course, the difunction quantizer of the rate servo of the invention will tend to generate a constant output rate only when the input difunction train $\rlap{/}{D}_\text{in}$ represents a rate having the same absolute magnitude, inasmuch as shaft 10 is servoed to rotate at a rate proportional to the input difunction. When the input rate difunction $\not{D}_{in}$ is varying with time, on the other hand, the difunction rate servo of the invention will also tend to vary in absolute magnitude in a similar manner. In other words, if the motor shaft is accelerating in a clockwise direction, the difunction signal will include more and more +1 signals over a given time interval, whereas the number of +1 signals will decrease concomitant with an increase in the number of —1 signals when shaft is 20 is being accelerated in the counterclockwise direction.

With reference now to Fig. 4, there is shown one embodiment of a counter control unit which may be employed in the bidirectional difunction rate servo of the invention, the particular embodiment shown in Fig. 4 comprising a conventional binary up-down counter 40 having N-stages and operative under the control of signals C and C' from difunction subtractor circuit 28 for respectively counting up or down, in response to clock pulse signals received from the clock pulse source. Binary up-down counters suitable for the described operation are well known to the art. For example the up-down counter described in U. S. Patent 2,656,106, issued October 20, 1953, for "Shaft Position Indicator Having Reversible Counting Means," by H. P. Stabler, may be utilized in the practice of the present invention. The bidirectional counter described in U. S. Patent 2,715,678 for "Rinary Quantizer," by K. H. Barney, is also utilizable. As shown in Fig. 4, the counter control unit also includes a motor control circuit 42 which is operative under the control of the conduction state of stage N of counter 40 for controlling the direction of energization of motor 22.

The particular motor illustrated in Fig. 4 is a two phase motor one winding of which is connected directly across a source 44 of alternating current, the other winding of motor 12 being selectively energizable, under the control of motor control circuit 42, by either the signal from source 44 or by the same signal shifted 180° in phase. Thus the sense or direction of energization of motor 12 is controlled by the value of the $N^{th}$ binary digit of the binary number stored in counter 40. Stated differently, during successive timing signal intervals the output signals from the $N^{th}$ counter stage may be considered as the difunction signals in a difunction signal train, a binary value of one in the $N^{th}$ stage corresponding to a difunction signal of plus one and functioning to energize motor 22 in one direction, while a binary value of zero corresponds to a difunction signal of minus one and functions to energize motor 22 in the opposite direction.

Before discussing the factors which determine the number of stages employed in counter 40, consider first the operation of the bidirectional difunction rate servo of the invention. Assume that initially the difunction input rate $\not{D}_{in}$ represents a zero value and includes alternate plus ones and minus ones. Assume also that a binary value of one in the $N^{th}$ stage of counter 40 functions to drive shaft 20 of motor 22 in a clockwise direction whereas a binary value of zero in the $N^{th}$ stage functions to drive shaft 20 in a counterclockwise direction.

If it is now assumed that the binary number stored in counter 40 is less than half the capacity of the counter, or in other words, that the $N^{th}$ digit has a binary value of zero, motor 22 will be fully energized in a counterclockwise direction and will thereby actuate quantizer 26 to produce an output difunction signal train $\not{D}_{out}$ representative of a negative quantity. Inasmuch as the zero representing input difunction $\not{D}_{in}$ includes alternate plus ones and minus ones, whereas output difunction signal train $\not{D}_{out}$ includes more minus ones than plus ones, it will be recognized from Table I that the difunction output train from difunction subtractor circuit 28 will have a positive average, thereby driving counter 40 in a positive direction.

As soon as the count in counter 40 has increased until it is half the binary capacity of the counter, the $N^{th}$ digit of the number stored therein will change to a binary one, and consequently a reverse or braking energization will be applied to motor 22, the deceleration of the motor in turn functioning to actuate the quantizer to reduce toward zero the negative quantity represented by output difunction signal train $\not{D}_{out}$. Thus difunction subtractor circuit 28 will have a net effect of increasing the number stored in counter 40 in an exponentially decreasing manner until shaft 20 is braked to a stop and then is forced to rotate in the opposite direction.

Thereafter output difunction signal train $\not{D}_{out}$ will represent an increasing positive rate which will in turn drive counter 40 to count down past half capacity at which time another reversal occurs. These oscillations will continue in decreasing amplitude until the shaft of motor 22 is substantially stationary with the $N^{th}$ digit of the number in counter 40 alternating between zero and one, thereby alternately energizing motor 22 in opposite directions with a net energization of zero. At this time difunction quantizer 26 will then produce a zero representing output signal having alternate +1's and —1's, which when subtracted from the zero representing input difunction signal train $\not{D}_{in}$ produces a difference difunction signal train having alternate +1's and —1's which will function to maintain the number in counter 40 in an alternating condition at half its capacity, the $N^{th}$ or most significant digit changing value every clock pulse time interval. Thus, for example, if it is assumed that $N=4$ so that the counter 40 has a capacity of 4 binary digits, the number stored therein would oscillate between 1000 and 0111, where the left hand digit represents the most significant digit which is stored in the $N^{th}$ stage of the counter.

Consider now the operation of the bidirectional rate servo of the invention when its equilibrium is disturbed by a change in the rate represented by input difunction signal train $\not{D}_{in}$. If it is assumed that the input rate goes positive, the input difunction rate $\not{D}_{in}$ will accordingly include more plus ones than it did at the preceding equilibrium condition. The occurrence of the extra plus ones in the input train will then function to increase the number of plus ones in the difunction output signal from difunction subtractor circuit 28 and hence result in an increase in the size of the number stored in counter 40. This, in turn, will function to accelerate shaft 20 in a clockwise direction and hence cause the difunction quantizer output signal $\not{D}_{out}$ to change its pattern to include more plus ones. Consequently the system will again ultimately stabilize with shaft 20 again rotating at a rate proportional to the input rate to which the input difunction has increased.

It should be here pointed out that acceleration of shaft 20 in a clockwise direction can occur in either of two manners, namely, by a positive acceleration of the shaft in the clockwise direction if the shaft at the prior equilibrium was either at a standstill or rotating clockwise, or by a deceleration of the shaft if the shaft at the prior equilibrium was rotating in a counterclockwise direction owing to a prior input rate having a negative average. In either case, the bidirectional rate servo of the invention will vary its output rate from the difunction quantizer in an oscillatory manner with alternate accelerating energizations and breaking energizations of the motor until the output rate again substantially equals the input rate received, at which time an equilibrium condition is again achieved.

In a similar manner it may be shown that if the rate represented by the input difunction moves negatively, whether it was positive or already negative at its prior equilibrium, the bidirectional rate servo of the invention will function to vary the rotational rate of shaft 20 proportionately and in the same average sense so that the rate represented by output difunction signal train $\not{D}_{out}$ follows the rate represented by the input difunction signal train.

It will be recognized from the foregoing description of operation that if counter 40 in the counter control circuit includes enough stages so that it never overflows, then the system of the invention provides not only a bidirectional rate servo, but in addition, an integrating or positioning servo having accurate motor follow up. In other words, the total rotation of shaft 20 will then correspond to the integral of the applied input rate with respect to time.

Consider now some of the factors which control the selection of the number of stages which should be utilized in counter 40 if accurate motor follow up is desired. The most significant factors which should be considered are the inertia of the motor rotor and cooperating mechanical parts of the quantizer, the repetition rate of the clock or timing signal, the maximum rate of change of the rate represented by the input difunction signal train $\emptyset_{in}$, and the torque which the motor can develop. In general, the higher the value of the first three of these factors, the more stages are required in counter 40, while the number of stages required is an inverse function of motor torque. For any particular application of the bidirectional difunction rate servo the proper number of counter stages may be readily determined empirically by observing the number of stages required to keep the counter from overflowing under all conditions.

It will be recognized that the foregoing description relates to applications where accurate motor followup is required, and that fewer counter stages may be employed if only a rough motor follow up is required, in which instance there may be an occasional loss of positional information. In fact it may be shown that the bidirectional rate servo of the invention may be operated purely as a rate servo with only a single stage or storage element in counter 40. If this is done the counter will contain information only as to the error of the difunction quantizer output rate, whether positive or negative, and is thus used primarily as a decision device for increasing or decreasing the rotational speed of the motor so that it is proportional to the rate represented by the applied input difunction signal train.

It will also be recognized, of course, that other forms of counter control units may be employed wherein the counter is operative to provide either proportional control of the motor or other forms of variable speed control thereof. For example, the counter control circuit may include a proportionate control network similar to that disclosed in the previously mentioned U. S. Patent 2,729,773. With reference now to Fig. 5, there is shown still another form of counter control network which again includes an N stage counter 40 for controlling the energization of motor 22, the motor illustrated in this instance being a D. C. motor. In this embodiment of the counter control network stage N of counter 40 is again employed during successive time intervals to present a difunction signal train for controlling the direction or sense of motor energization, while stage $(N-1)$ of counter 40 is utilized in conjunction with stage N to selectively provide either full or fractional energization of motor 22 in the direction determined by stage N.

As shown in Fig. 5, one structure which may be employed to actuate the motor includes a pair of relay amplifiers 50 and 52, relay amplifier 50 being operable under the control of stage N of counter 40 for actuating a switch 54 to selectively energize motor 22 from either a source of positive potential or a source of negative potential, neither of which is shown. Relay amplifier 52, on the other hand, is operable under the control of stages N and $(N-1)$ of counter 40 for actuating a pair of switches 56 and 57 to apply to motor 22 either the full potential from the positive and negative sources or fractional values thereof through a pair of resistors 58 and 59.

Assume now that the values of resistors 58 and 59 are such as to provide half speed energization of motor 22. If it is also assumed as hereinabove that counter 40 includes 4 stages, the correlation between motor energization and the number stored instantaneously in counter 40 is in accordance with the following table:

Table II

| Binary Digits In Counter Stages | | | | Energization of Motor 22 |
|---|---|---|---|---|
| 1 | 2 | 3 | 4 | |
| 0 | 0 | 0 | 0 | Full energization Counterclockwise. |
| 1 | 0 | 0 | 0 | |
| 0 | 1 | 0 | 0 | |
| 1 | 1 | 0 | 0 | |
| 0 | 0 | 1 | 0 | Half energization Counterclockwise. |
| 1 | 0 | 1 | 0 | |
| 0 | 1 | 1 | 0 | |
| 1 | 1 | 1 | 0 | |
| 0 | 0 | 0 | 1 | Half energization Clockwise. |
| 1 | 0 | 0 | 1 | |
| 0 | 1 | 0 | 1 | |
| 1 | 1 | 0 | 1 | |
| 0 | 0 | 1 | 1 | Full energization Clockwise. |
| 1 | 0 | 1 | 1 | |
| 0 | 1 | 1 | 1 | |
| 1 | 1 | 1 | 1 | |

It will be recognized that the counter control circuit of Fig. 5 will function in a manner substantially the same as that previously described with regard to the circuit of Fig. 4 to drive the motor shaft at a rate proportional to the rate represented by the applied input difunction signal train, the only material distinction between these circuits residing in the structure of Fig. 5 which provides a degree of proportionate control. In other words, both circuits, when employed in the digital rate servo of the invention, provide bidirectional control of the motor shaft and function to drive the shaft at a rate proportional to the rate represented by the applied input difunction signal train.

It will be understood, of course, that the bidirectional difunction rate servo of the invention may be modified or altered in other particulars without departing from the spirit or scope of the invention. For example, although it was assumed hereinabove that a binary value of one in the $N^{th}$ stage of counter 40 was operative to drive the motor shaft in the clockwise direction while a binary value of zero was operative to produce counterclockwise energization, it is clear that the difunction rate servo system of the invention may be modified so that clockwise and counterclockwise energization are produced by binary values of zero and one, respectively. Accordingly, it is to be expressly understood that the spirit and scope of the invention is to be limited only by the spirit and scope of the appended claims.

What is claimed as new is:

1. A bidirectional digital rate servo operable in response to an applied difunction input signal train representative of an input rate for driving the shaft of a motor in a direction corresponding to and at a rate proportional to the direction and amplitude of the input rate, said digital rate servo comprising: a bidirectional difunction quantizer coupled to the motor shaft and operable to produce a difunction output signal train consonant with the applied input train and representative of the direction and rate of rotation of the shaft; a difunction subtractor circuit for receiving the input difunction signal train and the output difunction signal train, said difunction subtractor circuit being operative to combine said trains to produce a difference difunction signal train representative of the direction and amplitude of the difference rate between the rate represented by the input difunction train and the rate represented by the output difunction train; a counter control circuit coupled to said difunction subtractor circuit and responsive to said difference difunction signal train for generating a composite signal representative of the sign and amplitude of the integral of the difference rate; and means for selectively controlling the direction of energization of the motor in accordance with the sign of said integral.

2. The digital rate servo defined in claim 1 wherein said counter control circuit includes a count-up count-down electronic binary counter having N stages for respectively storing said composite signal which includes N electrical signals respectively representative of the digits of an N digit binary number, said counter being operative to count-up when said difference rate has one polarity and to count-down when said difference rate has the opposite polarity whereby the binary value of the most significant digit of the binary number stored in said counter represents the sign of the integral of said difference rate.

3. A bidirectional digital rate servo operable in response to an applied difunction input signal train representative of an input rate for driving the shaft of a motor in a direction corresponding to and at a rate proportional to the direction and amplitude of the input rate, each signal in the difunction train having either a first value representing a plus one or a second value representing a minus one, said digital rate servo comprising: a bidirectional difunction quantizer coupled to the motor shaft and operable to produce a difunction output signal train consonant with the applied input train and representative of the direction and rate of rotation of the shaft; a difunction subtractor circuit for receiving the input difunction signal train and the output difunction signal train, said difunction subtractor circuit being operative to combine said trains to produce a difference difunction signal train representative of the direction and amplitude of the difference rate between the rate represented by the input difunction train and the rate represented by the output difunction train; a counter control circuit coupled to said difunction subtractor circuit, said counter control circuit including an N-stage up-down electronic binary counter operable to count in one direction in response to difunction signals in said difference train having said first value and to count the opposite direction in response to difunction signals in said difference train having said second value whereby the count stored in said counter represents the sign and amplitude of the integral of the difference rate, the sign of the integral being stored in the $N^{th}$ stage of said counter; and means coupled to said counter and responsive to the sign of the integral stored therein for selectively controlling the direction of energization of the motor.

4. A bidirectional digital rate servo operable in response to an applied difunction input signal train representative of an input rate for driving the shaft of a motor in a direction corresponding to and at a rate proportional to the direction and amplitude of the input rate, said digital rate servo comprising: a bidirectional difunction quantizer coupled to the motor shaft and operable to produce a difunction output signal train consonant with the applied input train and representative of the direction and amplitude of the rate of rotation of the shaft; means for generating a composite electrical signal representative of the integral of the rate difference between said input rate and the rate represented by said output signal train; and means responsive to said composite signal for selectively energizing the motor to drive the shaft in a direction to reduce toward zero the amplitude of the integral represented by said composite signal.

5. A digital rate servo operable in response to an applied difunction input signal train representative of an input rate for driving the shaft of a motor in a direction corresponding to and at a rate proportional to the direction and amplitude of the input rate, said digital rate servo comprising: a difunction quantizer coupled to the motor shaft and operable to produce a difunction output signal train consonant with the applied input train and representative of the direction and amplitude of the rate of rotation of the shaft; means for combining said input rate and the rate represented by said output signal train to produce a difference difunction signal representative of the direction and amplitude of the difference between said rates; means for generating and storing a composite electrical signal representative of the integral of said difference rate; and means responsive to said composite signal, for selectively energizing the motor to drive the shaft in a direction to reduce toward zero the amplitude of the integral represented by said composite signal.

6. A bidirectional digital rate servo operable in response to an applied difunction input signal train representative of an input rate for rotating the shaft of a motor in a direction corresponding to and at a rate proportional to the direction and amplitude of the input rate, each signal of the input train having either a first value representing a first algebraic number or a second value representing a second algebraic number, the first and second algebraic numbers having the same magnitude and opposite signs, said digital rate servo comprising: a bidirectional quantizer coupled to the motor shaft and operative to produce a difunction output signal representative of the direction and amplitude of shaft rotations; means responsive to the input difunction signal train and to said output difunction signal train to produce a difference difunction signal train representative of the direction and amplitude of the rate difference between the input rate and the rate represented by said output difunction signal train; and a counter control circuit operable in response to said difference difunction signal for controlling the direction of energization of the motor to rotate the shaft at an average rate proportional to the input rate, said counter control circuit including a reversible binary counter having at least one stage and being responsive to the difference difunction train for counting up in response to difunction signals in said difference train having said first value and being responsive to the difference difunction train for counting down in response to difunction signals in said difference train having said second value whereby the most significant digit of the number stored in said counter represents the sign of the positional error between the integral of the input rate and the rotational position of the motor shaft, said counter control circuit also including means for energizing the motor in one direction when the most significant digit of the count stored in said counter has a binary value of one and for energizing the motor in the opposite direction when the most significant digit of the count stored in said counter has a binary value of zero.

7. A bidirectional rate servo system for generating an output signal train corresponding to an applied input signal train representative of a bidirectional rate, said servo system comprising: an electric motor having a shaft and being energizable to rotate said shaft in either direction; a bidirectional quantizer coupled to said shaft and operable to produce an output signal train representative of the direction and amplitude of shaft rotation; means for combining the output signal train with the input signal train to produce a difference signal train representative of the direction and amplitude of the rate difference between the input rate and the rate represented by the output signal train; means responsive to said difference signal train for generating a composite signal corresponding to the sign and amplitude of the integral of the difference rate, and means responsive to said composite signal for selectively controlling the direction of energization of said motor in accordance with the sign of the integral of the difference rate.

References Cited in the file of this patent

UNITED STATES PATENTS 2,115,086   Riggs _________________ Apr. 26, 1938